I. F. BROWN.
Clothes-Wringer.

No. 161,662.  Patented April 6, 1875.

WITNESSES:

INVENTOR:
Israel F. Brown
BY
ATTORNEYS.

UNITED STATES PATENT OFFICE.

ISRAEL F. BROWN, OF NEW LONDON, CONNECTICUT.

IMPROVEMENT IN CLOTHES-WRINGERS.

Specification forming part of Letters Patent No. 161,662, dated April 6, 1875; application filed January 18, 1875.

*To all whom it may concern:*

Be it known that I, ISRAEL F. BROWN, of New London, New London county, Connecticut, have invented a new and Improved Clothes-Wringer, of which the following is a specification:

My invention consists of a shaft with anti-friction rollers interposed between the journals of the squeezing-rollers and their bearings, so that the journals turn upon the faces of the rollers, while their shafts turn on the bearings, so as to diminish in large measure the resistance due to the great pressure of the journals on the boxes, and thus enable the machine to be turned much easier than the wringers as now constructed can be.

Figure 1:
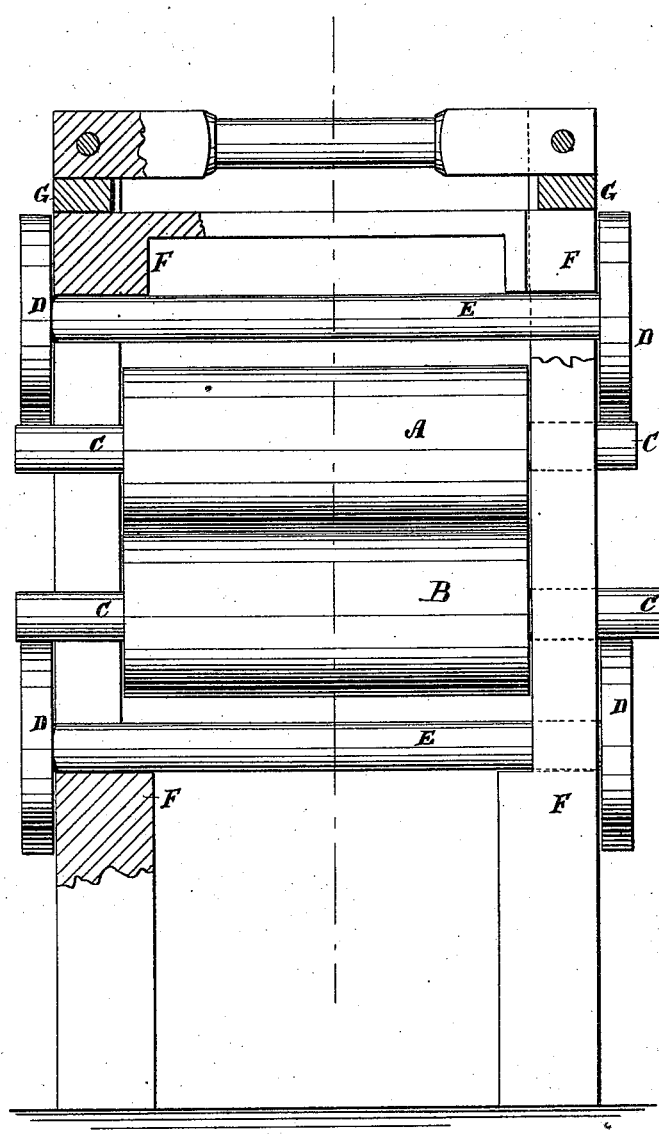
Figure 2:
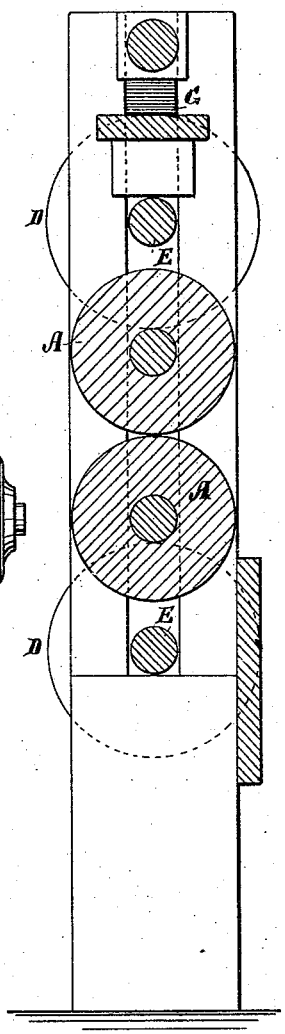

Figure 1 is partly a front elevation and partly a sectional elevation of my improved wringer, and Fig. 2 is a sectional elevation.

Similar letters of reference indicate corresponding parts.

A and B represent the squeezing-rolls, the journals C of which I propose to arrange on the anti-friction rollers D, whose shafts E rest on the bearings F, where the journals C of the squeezing-rolls commonly rest, and thus lessen the friction in the proportion of the difference in size of the rollers D and their shafts E.

The bearings of one or both of the shafts E may be movable, and have a spring, G, to hold the squeezing-rolls to their work.

By mounting the anti-friction rollers D on the shafts E, extending from one to the other of the housings, and contriving the rollers to overhang the bearings, the application of the anti-friction rolls to the wringer-rolls is rendered very simple and cheap, and the machine is not complicated in any objectionable way.

I am aware that a bushing formed of several rollers arranged in a case, and revolving around the journal as well as their own axes, is old; but I base my invention on the principle that the friction is as the weight or pressure, applying the friction to the circumference of a wheel, and thus diminishing it in proportion as the diameter of the wheel is greater than that of the shaft.

What I claim is—

The combination, with roll A, having extension-journals C C, of the wheels D D, arranged on the ends of spring-pressed shaft E, as and for the purpose specified.

ISRAEL F. BROWN.

Witnesses:
C. W. BUTLER,
JOHN BISHOP.